United States Patent [19]

Meloncelli et al.

[11] 4,385,555

[45] May 31, 1983

[54] BALER WITH A MODULAR BINDING UNIT

[75] Inventors: Giuseppe Meloncelli, Ferrara; Carlo Ribetto, Broni, both of Italy

[73] Assignee: Industrie Metallurgiche e Meccaniche S.A.I.M.M. S.p.A., Tresigallo, Italy

[21] Appl. No.: 266,812

[22] Filed: May 26, 1981

[51] Int. Cl.³ .............................................. B65B 13/08
[52] U.S. Cl. .................................................. 100/19 R
[58] Field of Search ...................... 100/8, 17, 18, 19 R, 100/20, 21, 22, 23, 4; 56/448, 453

[56] References Cited

U.S. PATENT DOCUMENTS 2,558,250 6/1951 Hill et al. ........................ 100/19 R
2,926,599 3/1960 McClellan ............................ 100/22
2,963,958 12/1960 Nelson et al. ...................... 100/22 X Primary Examiner—Billy J. Wilhite
Attorney, Agent, or Firm—Frost & Jacobs

[57] ABSTRACT

A baler having a tubular member arranged to be traversed by the material to be pressed and collected into bales, the tubular member having an upwardly opening aperture therein, a modular binding unit comprising at least one binding assembly and a modular frame for supporting the binding assembly, the modular frame being detachably connected to the tubular member and positioned to at least partially close the aperture therein, the modular frame serving to mount the binding assembly in operative relation with respect to the tubular member.

5 Claims, 3 Drawing Figures

BALER WITH A MODULAR BINDING UNIT

BACKGROUND OF THE INVENTION

This invention relates to a baler particularly suitable for forming bales of hay or other similar products.

Conventional balers generally comprise a front spring-mounted pick-up roller, which raises the hay from the ground and conveys it along a tubular member, hereinafter indicated by the term "rear tube", inside which the hay or straw is first compressed against a mobile obstacle, and then bound by one or more binding assemblies to form bales, which are discharged in succession through a rear open end of said rear tube.

The aforesaid known balers have certain drawbacks, due mainly to the fact that said binding assemblies are mounted directly on brackets and supports rigid with said rear tube.

A first consequence of this construction is that since the binding assemblies are assembled during their mounting on to said rear tube, the binding assemblies can be tested only when the baler is substantially finished. Moreover, with regard to the rear tube, a relatively high constructional precision is normally required, due to the fact that the support and connection points for a number of mutually cooperating mechanical members constituting the binding assemblies are disposed thereon. Such precision assembly is impossible in the case of a member constituted of welded plate, as in the case of said rear tube, the binding assemblies can be mounted only as the result of long and costly adjustments, which have to be carried out individually on each rear tube, which considerably influences the production cost of the entire baler.

Finally, the structural unity between the binding assemblies and said rear tube considerably complicates any repairs on the binding assemblies, and any necessary replacement of component parts thereof, as these operations automatically mean the baler cannot be used for relatively long periods, and it becomes substantially impossible to fit the same baler with a number of interchangeable binding assemblies using different binding materials, such as twine made from natural or synthetic fibres, and metal wire.

SUMMARY OF THE INVENTION

The object of the present invention is to provide a baler which is free from the aforesaid drawbacks.

The said object is attained according to the present invention by a baler comprising a rear tubular member of substantially parallelepiped section and arranged to be traversed by material to be baled, and a binding unit comprising at least one binding assembly disposed on said tubular member and arranged to cooperate with said material in order to bind it into bales as it moves along said tubular member, characterised in that the top of said tubular member comprises an aperture, and said binding unit comprises a modular frame connected to the tubular member by connection means; said frame supporting said binding assembly and at least partly closing said aperture.

In the aforesaid baler according to the present invention, the presence of said modular frame makes it possible to assemble the binding assemblies on the work bench and to test the entire binding unit before mounting it on said tubular member by means of said connection means.

In this manner, all the aforesaid adjustment operations are substantially dispensed with because of the fact that as said modular frame is of relatively small dimensions, it can be constructed with relatively narrow tolerances without this involving costs which would nullify the considerable economical advantages deriving from the fact that the binding units are series-assembled and are tested on the work bench.

The presence of said frame also enables the entire binding unit to be immediately replaced without having to stop the baler, with obvious advantages for the user both in the case of defects and in the case of the user himself wishing to change the type of binding by replacing the actual binding unit with another binding unit using a different binding material. For this purpose, the user has only to detach the connection means in order to remove the frame from the tubular member, on which a new binding unit can then be mounted.

BRIEF DESCRIPTION OF THE DRAWINGS

Further characteristics and advantages of the present invention will be apparent from the description given hereinafter with reference to the accompanying drawings, in which.

and

Figure 2:
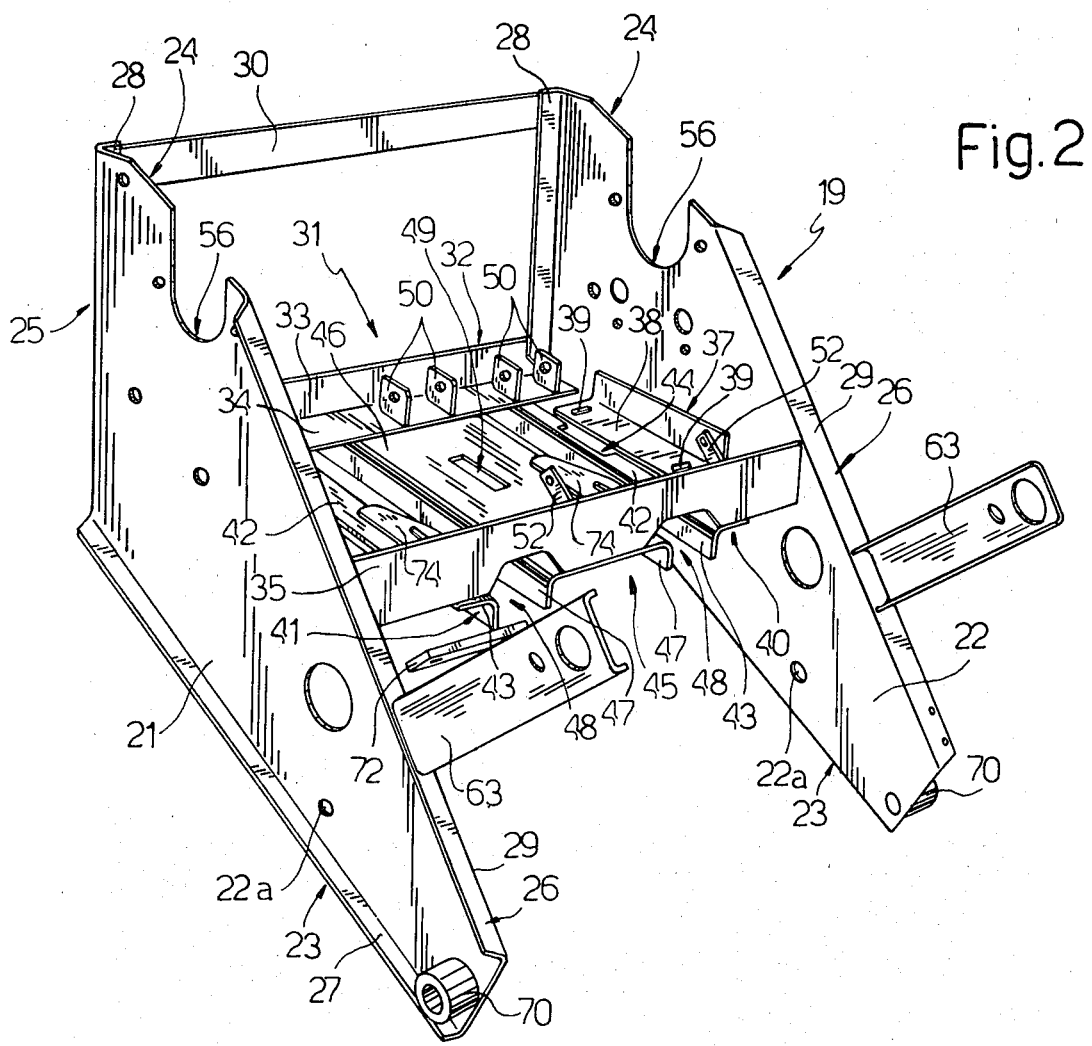
FIG. 2 is a perspective enlarged view of a detail of FIG. 1.
Figure 3:
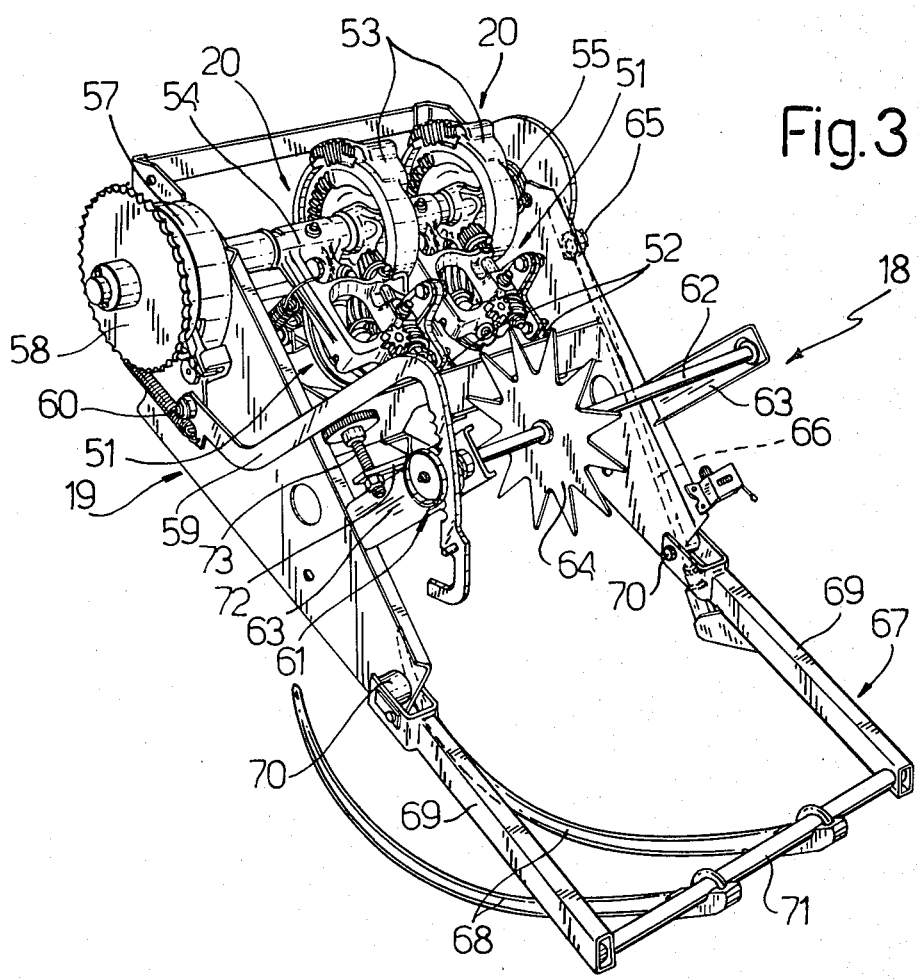

FIG. 3 is a perspective view of the detail of FIG. 2, completed by means of two binding assemblies of known type.

DETAILED DESCRIPTION OF THE INVENTION

Figure 1:
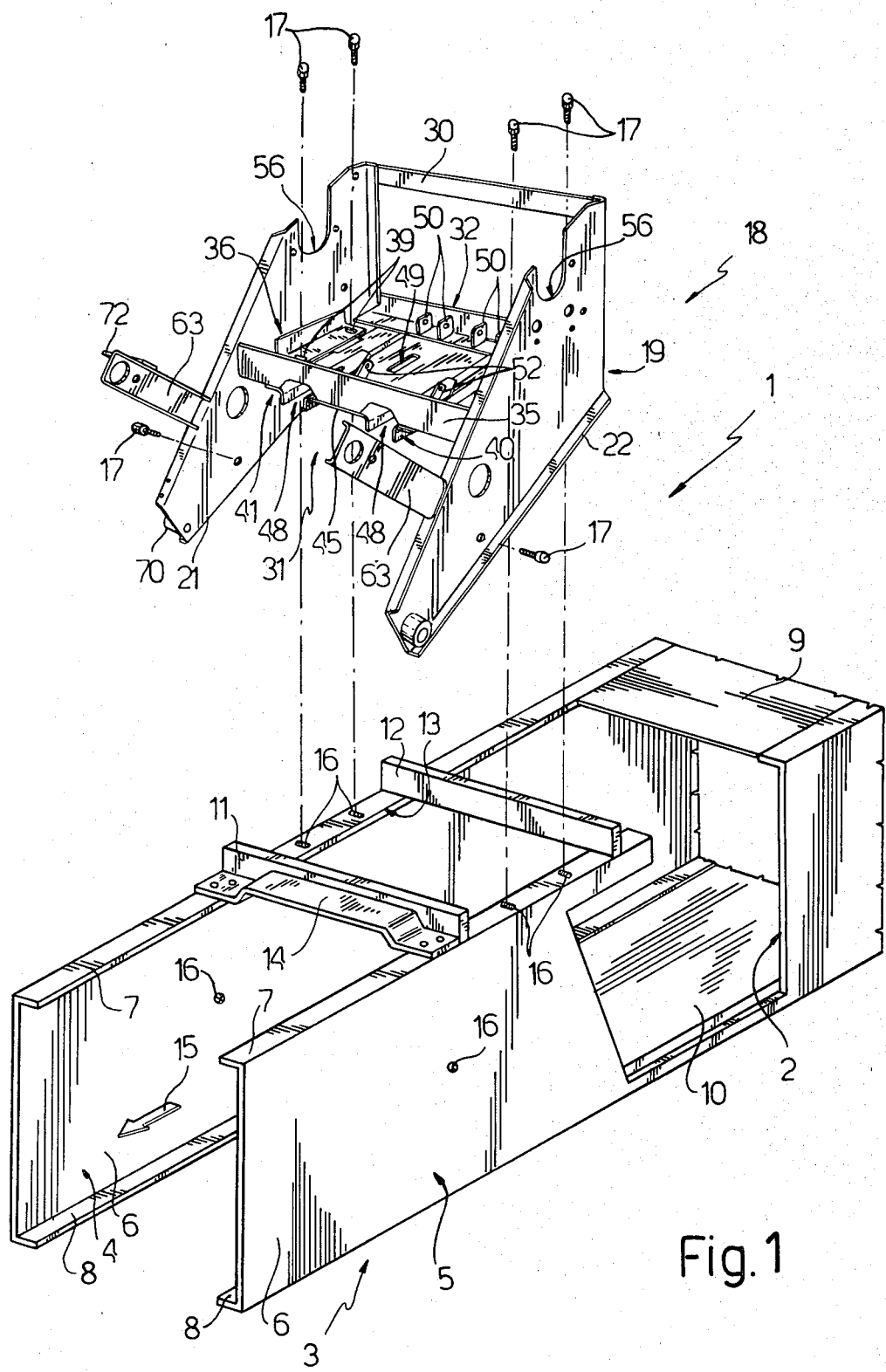
FIG. 1 is a partly exploded perspective view, with parts removed for clarity, of the rear end of a baler according to the present invention.

FIG. 1 shows a baler indicated overall by 1, in which a front roller (not shown) provided with radial springs and driven by a tractor by way of a Gardan shaft is arranged to collect from the ground in known manner the hay or straw to be baled, and to feed it through an aperture 2 to a tubular member 3, known as the rear tube, which extends towards the rear of the machine 1 and has a substantially parallelepiped section.

As shown in FIG. 1, the tube 3 is constituted by two U-shaped metal longitudinal members 4 and 5 mounted with their concavity opposing each other. The longitudinal members 4 and 5 each comprise a web 6, an upper flange 7 and a lower flange 8, which joined together at their front end by an upper plate 9 welded to the flanges 7 and a lower plate 10 welded to the flanges 8. The upper flanges 7 are also joined together by two cross members 11 and 12 constituted by strips disposed on their edge and defining between themselves and together with the edges of the two flanges 7 an upper aperture 13 of substantially rectangular shape. The two flanges 7 are also connected together by a U-shaped piece 14 disposed to the rear of the cross member 11 and in contact with it.

As shown in FIG. 1, the aperture 2 is provided through the web 6 of the longitudinal member 5 immediately upstream of the aperture 13 in the direction of movement of the material to be baled along the tube 3, said direction of movement being indicated by an arrow 15 in FIG. 1.

Pairs of bores 16 are provided through each web 7 in the space between the cross members 11 and 12, and a bore 16 is also formed in each flange 6, each of the bores being arranged to be engaged by a related bolt 17 for connecting a binding unit indicated overall by 18 and mounted on the tube 3 between the cross members 11 and 12 in such a manner as to at least partly close the aperture 2.

As shown in particular in FIG. 3, the binding unit 18 comprises a modular frame 19, in which are mounted two identical binding assemblies 20 arranged to bind the material moving along the tube 3 into bales.

The frame 19 comprises two parallel side plaes 21 and 22 disposed in a substantially vertical position, each substantially in the form of a rectangular trapezium disposed with its major base 23 at the bottom, its minor base 24 at the top and a vertical edge 25 facing the front end of the machine 1.

The base 23 is inclined downwards towards the rear end of the machine 1 starting from the lower end of the edge 25, and converges towards the rear end of a respective upper edge 26 which is inclined downwards starting from the rear end of the base 24. Stiffening ribs indicated by 27, 28 and 29 extend outwards from the base 23 and from the edges 25 and 26, respectively.

The side plates 21 and 22 are joined together by means of an upper tie bar 30 which connects together the upper ends of the ribs 28, and by a base 31 which rests on the flanges 7 of the tube 3 in the space between the strips 11 and 12 in order to at least partly close the aperture 13.

Each plate 21, 22 is provided with a bore 22a aligned with the bores 16 of the corresponding webs 6, and engaged by the related bolts 17.

In FIG. 2, the base 31 is defined at its front by an angle section 32 comprising a substantially vertical flange 33 welded to the lower ends of the ribs 28, and a substantially horizontal flange 34 extending rearwards between the plates 21 and 22, and defined at its rear by a substantially vertical plate 35 extending between two intermediate points of the plates 21 and 22 and rigid therewith. The base 31 also comprises two angle sections 36 (FIG. 1) and 37, one flange of which is welded into contact with the respective plates 21, 22, whereas the other flange, indicated by 38, is disposed in contact with the adjoining flange 7 and comprises two through slots 39 engaged by the related bolts 17 (FIG. 1). The flanges 38 are disposed on opposite sides of two further angle sections 40 and 41, each of which has a flange 42 rigidly connected to the flanges 34 and 35, respectively and a flange 43 which extends vertically downwards from the inner edge of the corresponding flange 42. The flange 42 of the section 40 comprises a recess along an edge thereof facing the corresponding flange 38, to define an elongated through aperture 44.

A central U-shaped section 45 is disposed between the sections 40 and 41, and has its web 46 rigidly connected to the flange 34 and plate 35, and its flanges 47 extending downwards parallel to the flanges 43, with which they define two slots 48 disposed on opposite sides of the section 45 and extending perpendicular to the flanges 34 and 35 throughout the entire base 31. The base is further provided with an aperture 49 similar to the aperture 44 and provided centrally through the web 46.

From the flange 34 there extend upwards two pairs of appendices defining two forks 50 rotatably supporting two straw retention arms (not shown) arranged to penetrate into the tube 3 through the apertures 44 and 49 in order, in known manner, to halt the flow of straw to the tube 3 during a binding operation carried out by the binding unit 18. As shown in FIG. 3, the binding unit comprises two binding assemblies 51 of known type, each of which is supported at its rear end by a separate bracket 52 extending forwards and upwards from the plate 35 and rigid therewith.

Each binding unit 51 is controlled by a separate cam 53 keyed on to a shaft 54 supported by bearings 55 housed in the recesses 56 provided in the minor base 54 of each of the plates 21 and 22. The shaft 54 is connected by a clutch 57 to a gear wheel 58 for driving the unit, and the angular connection between the wheel 58 and shaft 54 is controlled by the position of a lever 59 rotatable about a pivot 60 as the result of its connection by a rack-pinion coupling 61 to a shaft 62 supported by two struts 63 extending upwards from the edges 26 in a direction substantially perpendicular to the edges 26. A star wheel 64 is keyed on to the shaft 62, and is rotated by the straw advancing along the tube 3.

On one end of the shaft 54 there is keyed a crank 65 which, by way of a connecting rod 66, operates a lever 67 supporting two needles 68 arranged to move with pendular motion through the tube 3 and to extend through the two slots 48 in order to bring two wires (not shown) into cooperation with the binding units 51. The lever 67 is substantially of U-shaped configuration, and comprises two lateral arms 69 pivoted at 70 to the plates 21 and 22, and a central rod 71 supporting the needles 68.

One of the struts 63 is provided with a welded side bracket 72 which supports an adjustable stop 73 arranged to control the width of the angular movement of the lever 59.

Finally, the frame 19 comprises two wire guide brackets 74 of substantially triangular shape, welded respectively on to the plates 42 and 43 above the slots 48 and supporting wire tensioning sectors, not shown.

As the binding assemblies 20 are of known type, a detailed description of their operation is superfluous herein. What however is important to note is the fact that all the connectors and supports for the binding assemblies 20 are carried by the frame 19 and not by the tube 3, as in the case of known balers.

Within the principle of the invention, numerous modifications can be made to the baler 1 described by way of non-limiting example, without this leaving the scope of the present invention.

What we claim is:

1. A baler (1) comprising a rear tubular member (3) of substantially parallelepiped section and arranged to be traversed by material to be baled, and a binding unit (18) comprising at least one binding assembly (20) disposed on said tubular member (3) and arranged to cooperate with said material in order to bind it into bales as it moves along said tubular member (3), characterized in that the top of said tubular member (3) has an aperture (13) therein, and said binding unit (18) comprises a modular frame (19) connected to the tubular member (3) by detachable connection means (17), said modular frame having two side plates (21, 22) joined together by a base (31), said base being connected to said tubular member (3) by said detachable connection means (17) and being disposed in a position to at least partially close said aperture (13), a plurality of bracket means (50, 52, 74) extending from said base (31) for fixing said binding assembly (20) to said base, and a pair of struts (63) extending from said side plates (21, 22) and supporting a device (64) for measuring the quantity of material passing through said tubular member (3).

2. A baler as claimed in claim 1, characterized in that each said side plate (21, 22) includes an upwardly opening recess (56) engaged by a bearing (55) for supporting a shaft (54) for controlling each said binding assembly (20).

3. A baler as claimed in claim 1, characterized in that said base (31) comprises, for each said binding assembly (20), a longitudinal slot (48) arranged to be traversed by a needle (68) movable through said tubular member (3); each said needle (68) being supported by said side plates (21, 22) by a lever means (67).

4. A baler as claimed in claim 3 characterized in that said base (31) is provided, for each said longitudinal slot (48), with two longitudinal lower ribs (43, 47) disposed along said slot (48) and on opposite sides thereof.

5. A baler as claimed in claim 1, characterized in that said base (31) comprises, for each said binding assembly (20), a through aperture (44, 49) communicating with the inside of said tubular member (3), said base being provided, for each said aperture (44, 49), with an external forked bracket (50) rigidly connected to said base (31).

* * * * *